United States Patent
Rosen et al.

(10) Patent No.: US 8,185,415 B2
(45) Date of Patent: May 22, 2012

(54) METHODS AND SYSTEMS FOR COMPARING EMPLOYEE INSURANCE PLANS AMONG PEER GROUPS

(75) Inventors: Robert Rosen, Warren, VT (US); Alexandra Candelas, Arlington, MA (US); Richard Wood, North Reading, MA (US); Lori Dustin, Hopkinton, MA (US)

(73) Assignee: HighRoads, Inc., Woburn, MA (US)

( * ) Notice: Subject to any disclaimer, the term of this patent is extended or adjusted under 35 U.S.C. 154(b) by 371 days.

(21) Appl. No.: 12/169,104

(22) Filed: Jul. 8, 2008

(65) Prior Publication Data

US 2010/0010836 A1    Jan. 14, 2010

(51) Int. Cl.
*G06Q 40/00* (2012.01)
(52) U.S. Cl. ............................................. 705/4; 705/35
(58) Field of Classification Search .................. 705/4, 35
See application file for complete search history.

(56) References Cited

U.S. PATENT DOCUMENTS

| | | | |
|---|---|---|---|
| 2005/0187804 A1* | 8/2005 | Clancy et al. | 705/8 |
| 2006/0089862 A1* | 4/2006 | Anandarao et al. | 705/4 |
| 2006/0247953 A1* | 11/2006 | Pollack et al. | 705/4 |
| 2009/0037228 A1* | 2/2009 | Engel | 705/4 |
| 2009/0228301 A1* | 9/2009 | Youngblood et al. | 705/3 |

OTHER PUBLICATIONS

Blue Cross and Blue Shield of North Carolina Expands Availability of eInfoNOW(SM), an Online Group Reporting Tool PR Newswire. New York: Oct. 26, 2005. p. 1.*

MetLife Helps Employers Prepare for Upcoming Group Life Benefits Enrollment; Best Practices for Life Tool Now Online Business Wire. New York: Jul. 22, 2004. p. 1.*

* cited by examiner

*Primary Examiner* — Lalita M Hamilton
(74) *Attorney, Agent, or Firm* — David H. Judson

(57) ABSTRACT

The present invention is directed towards methods and systems for a benchmark based comparison of an employee insurance plan of an organization to employee insurance plans from other organizations in a peer group. The present invention enables a user to enter details about an employee insurance plan of a first organization and allows the user to compare the insurance plan to a benchmark computed from data collected from a plurality of organizations in a peer group of the first organization. The comparison report does not identify the organizations from which data is collected.

21 Claims, 9 Drawing Sheets

METHODS AND SYSTEMS FOR COMPARING EMPLOYEE INSURANCE PLANS AMONG PEER GROUPS

FIELD OF THE INVENTION

The present invention generally relates to web-based services and computer systems for comparing a plurality of insurance plans.

BACKGROUND OF THE INVENTION

Employers offer health insurance plans to employees. A plurality of vendors of insurance plans offer employers a wide range of choice in picking their employee insurance plans. Some web based services compare bids and plans from different vendors where each bid or plan is specifically identified with the vendor offering the bid or plan. These services do not allow a user in an organization to compare a bid or plan from a vendor to see how the bid or plan compares to the general practice within a peer group of organizations. Further, organizations within the peer group may not agree to disclose their employee insurance plans outside confidentiality. Thus, an employer may not know how their plan or potential plans compare to offerings by other employers.

BRIEF SUMMARY OF THE INVENTION

The present invention relates to methods and systems for a benchmark based comparison of an employee insurance plan of an organization to employee insurance plans from other organizations in a peer group. This enables a user to enter details about an employee insurance plan of their organization and allows the user to compare the insurance plan to a benchmark computed from data collected from a plurality of organizations in a peer group of the first organization. The comparison report does not identify the organizations from which data is collected.

In one aspect, the present application features a method for comparing insurance plans of employees among a peer group. The method includes receiving data on a plurality of attributes of an employee insurance plan of an organization via a web interface. One or more attributes are also received as comparison criteria. A computing device performs a comparison of the user provided data to a benchmark, based on the comparison criteria where the benchmark is associated with a plurality of employee insurance plans of organizations in a peer group. At least one report is generated based on the comparison and the report is provided to the user via the web interface.

In one embodiment, the peer group is a group of organizations substantially similar to the organization of the user in one or more of the following: number of employees, line of business, location, turnover, profit margin, and product. In another embodiment, the comparison criteria includes one or more of an employer attribute, a location attribute, a plan attribute, a bid attribute, a price specification item attribute, a benefit attribute and a vendor attribute. In still another embodiment, the method includes computing the benchmark for based on mathematical operations on data collected for a plurality of insurance plans of employees among the peer group. In yet another embodiment, the report does not identify any organization in the peer group. In a further embodiment, the method includes controlling access and permissions of the user.

In another aspect, the present application features a method for using a benchmark for comparing insurance plans among a peer group of an organization. The method includes selecting one or more attributes as benchmark criteria for a plurality of insurance plans of the peer group. Data on the attributes for the plurality of insurance plans are accessed by a computing device. The computing device transforms the accessed data for each of the plans to one or more canonical forms using one or more mathematical operations. The canonical forms enable mathematical comparisons across the plurality of insurance plans. A benchmark is created through operations on the one or more canonical forms. The benchmark is stored and the computing device outputs the benchmark for comparing an insurance plan of the organization to the benchmark. The attributes of the comparison is provided by a user.

In one embodiment, the method includes creating a composite benchmark criteria based on one or more attributes of the benchmark. In another embodiment, the method includes defining a relationship between the one or more attributes. In still another embodiment, the method includes associating a quantitative score with each of the one or more attributes. In yet another embodiment, the benchmark criteria includes one or more of an employer attribute, a location attribute, a plan attribute, a bid attribute, a price specification item attribute, a benefit attribute and a vendor attribute. In another embodiment, the method includes classifying the data on the plurality of insurance plans into one or more classes. The classes are defined by an administrator based on one or more attributes. In a further embodiment, the method includes defining a relationship between the one or more classes. In still another embodiment, the method includes associating a quantitative score with each of the one or more classes.

In still another aspect, the present application features a system of presenting a comparison of insurance plans. The system includes a database that stores information on a plurality of attributes of a plurality of employee insurance plans. The system also includes a server that communicates with the database and processes information stored in the database based on information from a client and one or more rules. The server also identifies at least one peer group within organizations associated with the plurality of insurance plans. The system further includes a client that communicates with the server and provides information on an insurance plan associated with an organization. The client also receives at least one report which is generated by comparing the provided information to a benchmark data. The benchmark is calculated by the server with respect to the identified peer group.

In one embodiment, the server identifies a peer group based on substantial similarity to the organization in one or more of the following: number of employees, line of business, location, turnover, profit margin, and product. In another embodiment, the system includes an Extraction, Transformation and Loading (ETL) unit that manages data transport between the server and the database. In still another embodiment, the system includes an adaptor which communicates with the ETL unit and generates a value of an attribute stored in the database. In yet another embodiment, the system includes one or more subsystems for performing the following: authentication and access control, attribute management and report management. In further embodiments the system includes a user interface and/or an administrator interface.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 5A and 5B are example screenshots of user interfaces presented to a user.

FIGS. 6A, 6B and 6C are example screenshots of reports generated responsive to data provided by a user.

Figure 1:
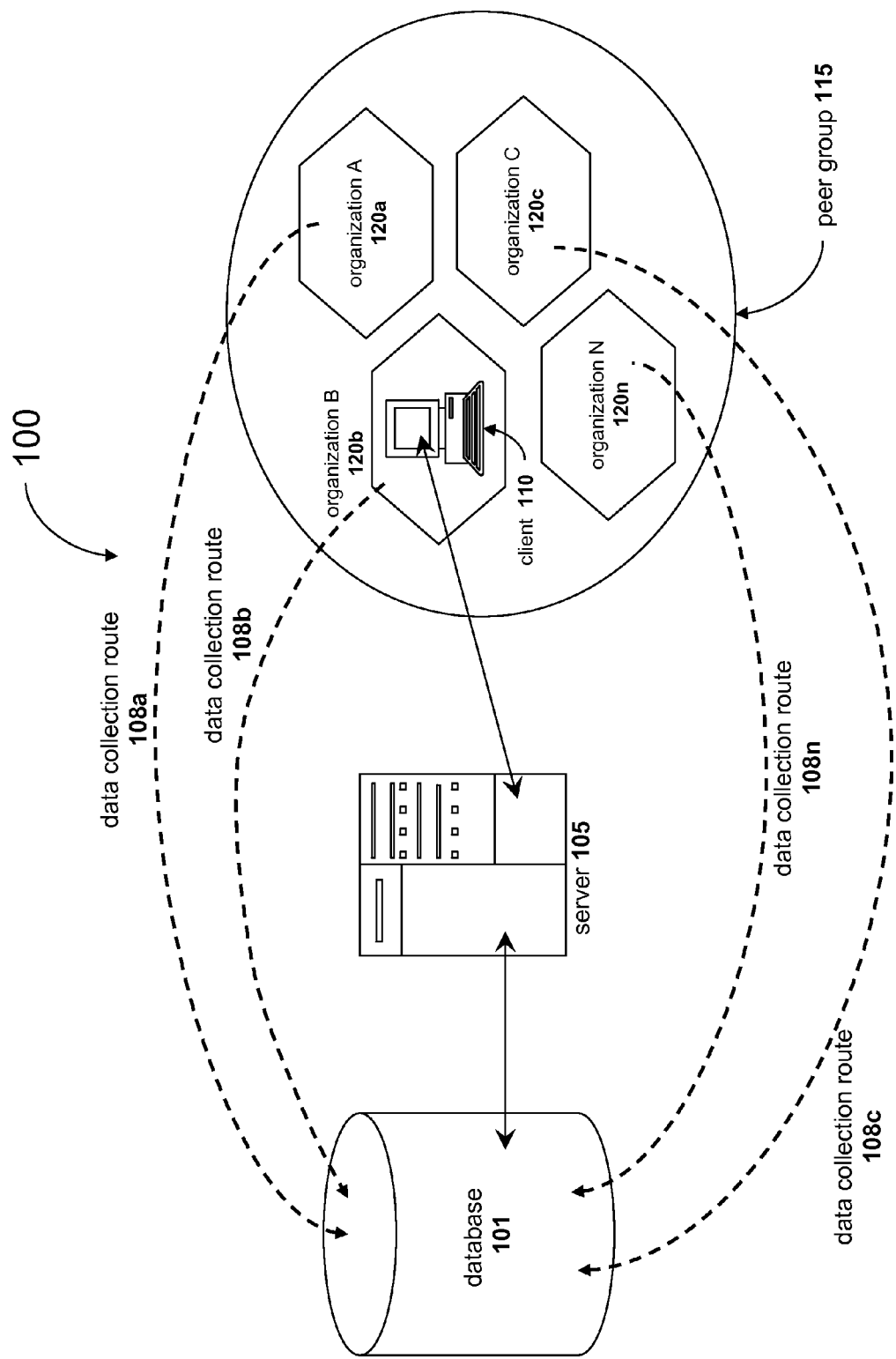
FIG. 1 is a diagram depicting an example environment in which clients in a plurality of peer group organizations communicate with a database via a server.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Referring to FIG. 1, an environment 100 in which clients in a plurality of peer group organizations communicate with a database via a server is shown. In brief overview, the environment includes a database 101, a server 105 and a peer group of organizations 115. In one embodiment, an organization 120 includes a client computer 110 communicating with the database 101 via the server 105.

Broadly, data on employee insurance plans of a plurality of organizations 120a-120n in a peer group 115 are collected via the data collection routes 108 and stored in the database 101. The server 105 accesses the collected data and computes a benchmark data based on one or more benchmark criteria. In one embodiment, the one or more benchmark criteria are provided by a user of the client 110 in an organization B 120b. The user also provides data on a employee insurance plan of organization B 120b and one or more comparison criteria. The server 105 generates one or more comparative reports comparing the data from organization B and the benchmark data.

Still referring to FIG. 1, now in greater details, a peer group 115 comprises a plurality of organizations 120a-120n (120 in general) which are substantially similar to each other in one or more ways. In one embodiment, a peer group may constitute organizations and/or companies in a substantially similar line of business. In other embodiments, a peer group may be defined based on substantial similarity in one or more of the following attributes related to an organization and/or a company: turnover, number of employees, location, profit margin, product and any other attribute apparent to one skilled in the art.

In one embodiment, the database 101 is a repository of information pertaining to different employee insurance plans from a plurality of organizations 120. In another embodiment, the database 101 stores information on one or more of users, user types and user groups authorized to access the database 101. In still another embodiment, the database stores information on the employee insurance plans in the form of files, tables, indices and constraints. In yet another embodiment, the database 101 stores procedures and software programs to manage and handle stored data. In another embodiment the database 101 stores object attribute values and relationships associated with the stored data. In one embodiment, the database 101 stores data collected from a plurality of sources. In another embodiment, the database 101 stores data derived or calculated from the collected data. In one embodiment, the database 101 stores benchmark data calculated from the employee insurance plans of the plurality of organizations 120.

In one embodiment, the database 101 resides on the server 105. In another embodiment, the database 101 resides on a server 105' (not shown) separate from the server 105. In still another embodiment, the database 101 is distributed across a plurality of servers that may or may not include the server 105. In yet another embodiment, the database 101 may reside in a storage location of a plurality of possible types as apparent to one ordinarily skilled in the art.

The database 101 stores data collected from a plurality of organizations 120a-120n (120 in general) through one or more data collection routes 108a-108n (108 in general). In one embodiment, the plurality of organizations 120 includes the organization B 120b of the user. In one embodiment, the data collection route 108 includes an automated agent collecting information from one or more organizations 120 on employee insurance plans related to the one or more organizations 120. In another embodiment, the data collection route 108 includes an agent collecting information from a plurality of insurance plan vendors on their plans and/or bids. In another embodiment, the data collection route 108 includes one or more human representative collecting data from the one or more organizations 120 on employee insurance plans related to the one or more organizations 120. In still another embodiment, the data collection route 108 includes a system of storing data provided by a user of a client 110 within an organization 120b. In one embodiment, the data collection route 108 includes one or more computing devices that transform the data to a suitable format for storage. In another embodiment, the one or more computing devices transform data collected on the employee insurance plans to a canonical form. In still another embodiment, the one or more computing devices normalize the data collected on the employee insurance plans. In yet another embodiment, the transformation of data is performed by an application executing on the server 105. In another embodiment, the one or more computing devices encrypt the data collected from the plurality of organizations 120.

In one embodiment, the data collection routes 108 originate from the plurality of organizations 120. In another embodiment, the data collection routes 108 originate from a data source external to the organizations 120, the data source storing data on insurance plans related to the plurality of organizations 120. In one embodiment, the data collection route 108 includes one or more servers. In another embodiment, the data collection route 108 includes the server 105.

In one embodiment, the server 105 communicates with the database 101 to process data stored in the database 101. In another embodiment, the server 105 receives input from a client 110 and processes data based on the input received from the client 110. In still another embodiment, the server 105 presents processed data to the client 110.

In one embodiment, the server 105 can be a single server communicating with the database 101 and the plurality of organizations 120. In some embodiments, the server 105 can be a group of multiple, logically-grouped servers. In these embodiments, the logical group of servers may be referred to as a server farm 105' (not shown). In some of these embodiments, the server farm 105' may be geographically dispersed. In yet other embodiments, the server farm 105' comprises a plurality of server farms. The servers 105 within each farm 105' can be heterogeneous. One or more of the servers 105 can operate according to one type of operating system platform (e.g., WINDOWS NT, manufactured by Microsoft Corp. of Redmond, Wash.), while one or more of the other servers 105 can operate on according to another type of operating system platform (e.g., Unix or Linux).In one embodiment, the server 105 is external to the peer group 115. In another embodiment, the server 105 can reside within the peer group 115.

In some embodiments, the server 105 executes an application to communicate with the client 110. In other embodiments, the server 105 executes a virtual machine, which provides an execution session within which applications execute to communicate with the client 110. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute. In one embodiment, the server 105 communicates with the client 110 via a web based environment.

The server 105 may be a file server, application server, web server, proxy server, appliance, network appliance, gateway, application gateway, gateway server, virtualization server, deployment server, secure socket layer virtual private network (SSL VPN) server, or firewall. In some embodiments, the server 105 provides a remote authentication dial-in user service, and is referred to as a RADIUS server.

The server 105 communicates with clients 110 within an organization 120. Even though only one client 110 is shown, there may be a plurality of clients 110a-110n (not shown) in each organization 120. The clients 110 may also be referred to as client nodes, client machines, endpoint nodes, or endpoints. In some embodiments, a client 110 has the capacity to function as both a client node seeking access to resources provided by a server and as a server providing access to hosted resources for other clients 110a-110n.

In one embodiment, the server 105 provides the functionality of a web server. In another embodiment, the server 105 receives requests from the client 110 and responds to the request by the client 110. In still another embodiment, the server 105 receives data on an employee insurance plan of the organization 120 of the client 110. In one embodiment, the server 105 communicates with the database 101 to retrieve data based on the request from the client 110, performs calculations based on the retrieved data and forwards the results of the calculations to the client 110 as a response to the request. In another embodiment, the server 105 presents the response to the request to the client 110 using a web interface. In one embodiment, the client 110 communicates directly with the server 105 to access an identified application. In another embodiment, the client 110 receives output data, such as display data, generated by an execution of the identified application on the server 105. In one embodiment, the display data includes comparison results of the employee insurance plan of the organization 120 with the benchmark data stored in the database 101.

The peer group 115 includes a plurality of organizations 120 substantially similar to each other in one or more respects. In one embodiment, the organizations 120a-120n within the peer group 115 are substantially similar to each other in a line of business sense. As an example a typical peer group of an organization providing legal services may include a plurality of legal firms and other organizations providing professional services. In another embodiment, the organizations 120a-120n within the peer group 115 are substantially similar to each other in turnover. In other embodiments, the organizations 120a-120n within the peer group 115 may be substantially similar to each other in one or more of the following: number of employees, location, profit margin, product and any other attribute as apparent to one ordinarily skilled in the art. By way of example, a peer group for a car dealership with 50 employees in Boston, Mass. may be defined to include organizations that: a) are vehicle dealerships, b) have 50-100 employees, c) are located in Massachusetts and c) sell 8000-10000 vehicles per year. As another example a peer group for the same car dealership can simply be a group of all other vehicle dealerships in Boston. In one embodiment, a definition of a peer group and a list of member organizations 120 are stored in the server 105 or the database 101. In one embodiment, a peer group 115 may include one or more other peer groups. As an example, a peer group of vehicle dealerships in Boston may include a peer group of German automakers' dealerships in Boston. In another embodiment, an organization 120 may be included in more than one peer group 115. As an example, a BMW dealer in Boston may be in a group of German automakers' dealerships as well as in a group of organizations with a total turnover above a certain threshold.

Figure 2:
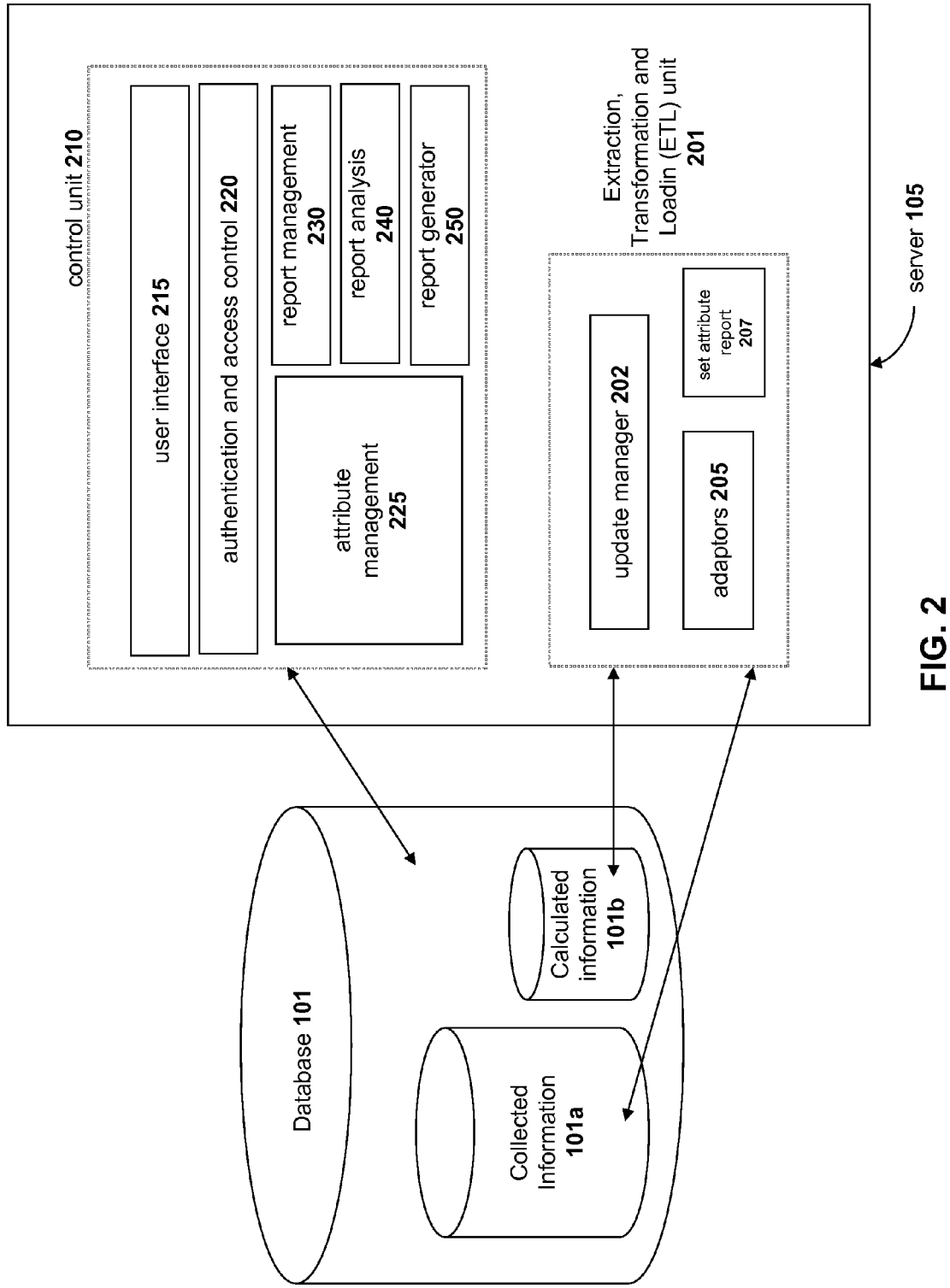
FIG. 2 is a block diagram depicting an embodiment of a server communicating with a database.

Referring now to FIG. 2, a block diagram depicting an embodiment of the server 105 communicating with the database 101 is shown and described. In brief overview, the database 101 includes collected information 101a and calculated information 101b. The server 105 includes a control unit 210 and an Extraction, Transformation and Loading (ETL) unit 201. In one embodiment, the control unit includes one or more of a user interface 215, an authentication and access control unit 220, an attribute management unit 225, a report management unit 230, a report analysis unit 240 and a report generator unit 250. In another embodiment, the ETL unit 201 includes an update manager 202, adaptors 205 and set attribute report unit 207.

In one embodiment, collected information 101a includes data on the employee insurance plans of the plurality of organizations 120. In another embodiment, collected information 101a includes files, tables, indices and constraints associated with data collected from the organizations 120 over the data collection routes 108. In still another embodiment, collected information 101a includes the information of users authorized to access the server 105 and/or the database 101.

Calculated information 101b is calculated based on the collected information 101a. In one embodiment, calculated information 101b is based on information received from the client 110. In another embodiment, calculated information 101b is calculated based on one or more attributes as communicated by the attribute management unit 225. In yet another embodiment, calculated information 101b is based on one or more of an attribute, an user, role of the user, type of an attribute, group of attributes, values of attributes and a relationship between one or more attributes. In still another embodiment, calculated information 101b may include information on authorized users.

The control unit 210 serves as an interface with the client 110. In one embodiment, a control unit interfaces with a user. In another embodiment, a control unit 210 interfaces with an administrator authorized to manage different units. In one embodiment, a control unit 210 includes an user interface 215. In another embodiment, the user interface 215 is a web browser based interface. In still another embodiment, a user interface is an application program executing on the server. In yet another embodiment, a user interface is an application program executing on the client 110 in communication with the server 105. In one embodiment, a user interface 215 includes a benchmark wizard that queries the user on different attributes of a benchmark. In another embodiment, a user interface 215 includes a form for querying the user on attributes of an employee insurance plan of the organization of the user. In still another embodiment, a user interface includes a report wizard that generates one or more comparative reports based on the user's preferences.

In one embodiment, a user interface allows the user to create a profile. In another embodiment, a user interface allows the user to access and edit a previously created profile. In another embodiment, a user interface provides the user to access the benchmark wizard or the report wizard.

In one embodiment, the user interface 215 includes an administrator console which allows the administrator to perform one or more of the following: organization maintenance, attribute management, review, edit and delete an employee insurance plan from an organization 120 and manage benchmark data. In one embodiment, the administrator console allows an administrator to add value to an attribute, define a group of attributes and create new attributes. In another embodiment, an administrator can view usage and audit reports from the administrator console. In still another embodiment, the usage and audit reports include but are not limited to a missing attribute report, a marketing report, a statistical report and an expiration report. In yet another embodiment, the administrator console allows the administrator to perform system maintenance such as changing a default trial period. In one embodiment, the administrator console allows user maintenance such as adding users, deleting users, setting an expiration for an user and changing user type.

The control unit 210 may include an authentication and access control unit 220. In one embodiment, the authentication and access control unit 220 provides a secure connection between the server 105 and the client 11 0. In another embodiment, the authentication and access control unit 220 manages a user session and decides on a level of access a particular user is entitled to. In still another embodiment, the authentication and access control unit 220 provides the secure connection via any type and/or form of gateway or tunneling protocol such as Secure Socket Layer (SSL) or Transport Layer Security (TLS).

In one embodiment, the authentication and access control unit 220 authenticates a user based on one or more authentication credentials associated with the user. In another embodiment, the authorization credentials may include user names, client names, client addresses, passwords, Personal Identification Numbers (PINs), one-time passcodes, biometric data, digital certificates, tickets, etc. and combinations thereof. In still another embodiment, the user is issued the authorization credentials responsive to a payment. In yet another embodiment, the user is issued limited time authorization credentials for a trial use.

In one embodiment, the attribute management unit 225 is accessed by an administrator to manage one or more attributes associated with employee insurance plans of the organizations 120. In another embodiment, the attribute management unit 225 allows the administrator to perform one of creating, deleting and updating the attributes. In still another embodiment, the attribute management unit 225 enables the administrator to define relationships between a plurality of attributes. In yet another embodiment, the attribute management unit 225 communicates with the set attribute report unit 207 to update the ETL unit 201 on the latest attributes.

Generation and presentation of reports are managed by the report management unit 230, the report analysis unit 240 and the report generator 250. In one embodiment, the report management unit 230 implements overall report capabilities for all reports. In another embodiment, the report analysis unit 240 performs analysis on one or more generated reports. In still another embodiment, the report analysis unit performs report formatting for the one or more generated reports. In yet another embodiment, report analysis unit 240 communicates with both the report management unit 230 and the report generator 250. In another embodiment, the report analysis unit 240 performs the analysis and formatting based on a request received from the client 110. In one embodiment, the report generator 250 generates the one or more reports for presentation to the client 110. In another embodiment, the report generator 250 generates the report in communication with the report analysis unit 240 and based on the request received from the client 110. In one embodiment, the report generator 250 generates one or more reports on the benchmark data computed based on employee insurance plans of the plurality of organizations 120. In another embodiment, the report generator 250 generates one or more reports comparing the benchmark data to data provided by the user on an employee insurance plan of the user's organization 120.

In one embodiment, the ETL unit 201 forms a bridge between the collected information 101a and the calculated information 101b. In another embodiment, the ETL unit 201 manages data transport between the database 101 and the server 105. In another embodiment, the set attribute report unit 207 of the ETL unit 201 communicates with the attribute management unit 225 to receive the latest attributes and their relationships as defined by the administrator. In still another embodiment, the ETL unit uses the adaptors 205 to generate a set of object attribute values based on the latest attributes. In yet another embodiment, the set of object attribute values are generated based on a request from the administrator. In one embodiment, the update manager 202 stores the generated object values in the calculated information 101b. In another embodiment, the stored object values are used by the control unit 210 for generation of reports.

Figure 3:
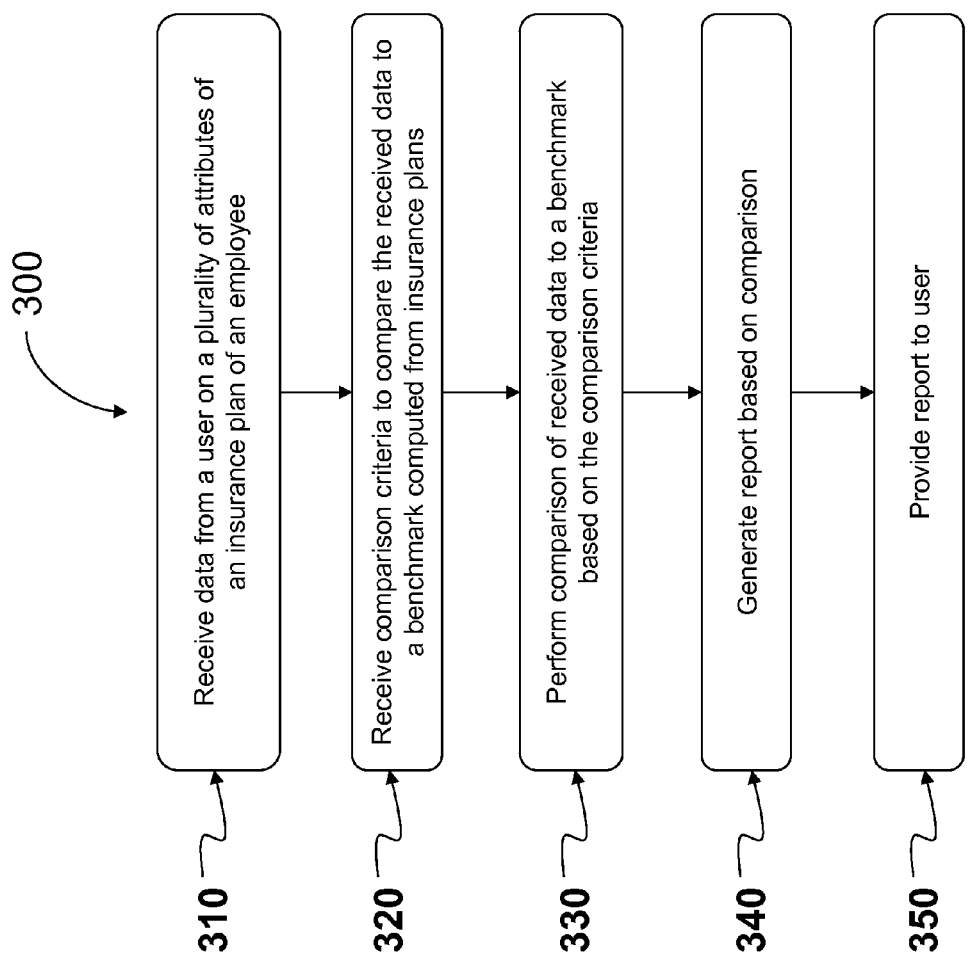
FIG. 3 is a flow diagram of a method for comparing an insurance plan within a peer group.

Referring now to FIG. 3, a flow diagram of a method 300 for comparing an insurance plan within a peer group is shown. In brief overview, a system receives data from a user on a plurality of attributes of an insurance plan of an employee (step 310). The system 110 also receives comparison criteria to compare the received data to a benchmark (step 320). A server 105 compares received data to a benchmark based on the comparison criteria (step 330). The system generates based on the comparison (step 340) and provides report to the user (step 350). Although, the method is described as being performed on a client-server system, it should be apparent to one skilled in the art that the method may be implemented using one or more of any other computing devices.

Still referring to FIG. 3, now in greater details, the system may receive data from the user via a client 110 in any manner (step 310). In one embodiment, the data is received via a web interface. In another embodiment, the data is received by an application program executing on the client 110. In one embodiment, the data received from the user is known as base data. In one embodiment, the base data is an employee insurance plan of the organization 120 of the user. In another embodiment, the base data is a bid for an insurance plan. In another embodiment, the base data is a questionnaire. In still another embodiment, the base data includes but is not limited to one or more of the following attributes of the employee insurance plan: industry type, number of employees, geographic location, location of coverage, type of coverage, plan price or bid, contract duration, expected enrollment, plan source, add on(s) and type of employee.

The client also receives from a user one or more comparison criteria to compare the base data to a benchmark (step 320), the comparison criteria being attributes related to insurance plans. In one embodiment, the comparison criterion can be an employer attribute. In another embodiment, the comparison criterion can be a plan attribute. In other embodiments, the comparison criteria is one or more of the following: an employer location attribute, a bid attribute, a price specification item attribute, a benefit specification item attribute and a vendor attribute. In one embodiment, the comparison criteria can be used to derive more complex comparison criteria. In another embodiment, the received comparison criteria may be subjected to one or more mathematical and/or logical operations. In still another embodiment, the received comparison criteria may be assigned a numerical value.

A system may then compare the base data to a benchmark in any manner, the comparison being based on the comparison criteria (step 330). In one embodiment, the comparison is performed using benchmark data related to one or more organizations 120 in a peer group 115 of the organization from where the base data originates. In another embodiment, performing the comparison includes executing one or more mathematical and/or logical operations on the base data. In another embodiment, performing the comparison includes executing one or more mathematical and/or logical operations on the benchmark data. In still another embodiment, performing the comparison includes creating a set of statistical comparisons based on a defined process. In another embodiment, performing the comparison is based on one or more requests received from a user. In yet another embodiment, the comparison is performed based on instructions from an administrator. In one embodiment, a part of the comparison is performed manually by a human operator.

One or more reports of various types may then be generated based on the comparison (step 340). In one embodiment, the report includes one or more visual aids to present the comparison results including graphs, tables and charts. In another embodiment, the generated report may include multimedia content such as video, audio and interactive content. In still another embodiment, the generated report for insurance plans includes results based on one or more of the following: rankings by percentile, in vs. out network provisions, key evaluation criteria, comparison criteria and benchmark criteria. In some embodiments, the generated report includes comparison results related to one or more of the following attributes of insurance plans: out of packet maximum amount, deductibles, administrative cost, co-pay and co-insurance. In other embodiments, the generated report includes comparison results related to the following types of services including preventive care, maternity care, emergency care, mental health care, substance abuse, alternative care, family planning, prescription medication, vision care, dental care and hearing care.

In one embodiment, the generated report represents where the organization B 120b of the user stands in terms of insurance plan offered to employees compared to other organizations 120 in the peer group 115 of the organization B 120b. In another embodiment, the generated report does not identify the organizations 120 in the peer group 115. In still another embodiment, the generated report does not present separately the data collected from a plurality of organizations 120. In yet another embodiment, the generated report separately presents the data collected from a plurality of organizations 120 but does not identify the individual organizations 120.

The generated report may be provided to the user in any manner (step 350). In one embodiment, the report is provided to the user via the client 110. In another embodiment, the report is provided via email to the user. In still another embodiment, the report is provided over a web interface. In yet another embodiment, the user is authenticated to the system prior to providing the report. In one embodiment, the user is prompted for payment prior to providing the report and the report is provided responsive to a successful receipt of payment.

It should be apparent to one of ordinary skill in the art that in one embodiment, the steps depicted in FIG. 3 may be programmed using a software and stored on a computer readable medium. In another embodiment, these steps may be executed on any computing device. In one embodiment, the computing device may be one or more of a server, a desktop machine, a laptop, a network appliance and a combination thereof. In another embodiment, the computing device may be any other device, gadget or appliance capable of connecting to a network and/or executing computer program code stored on a computer readable medium.

Figure 4:
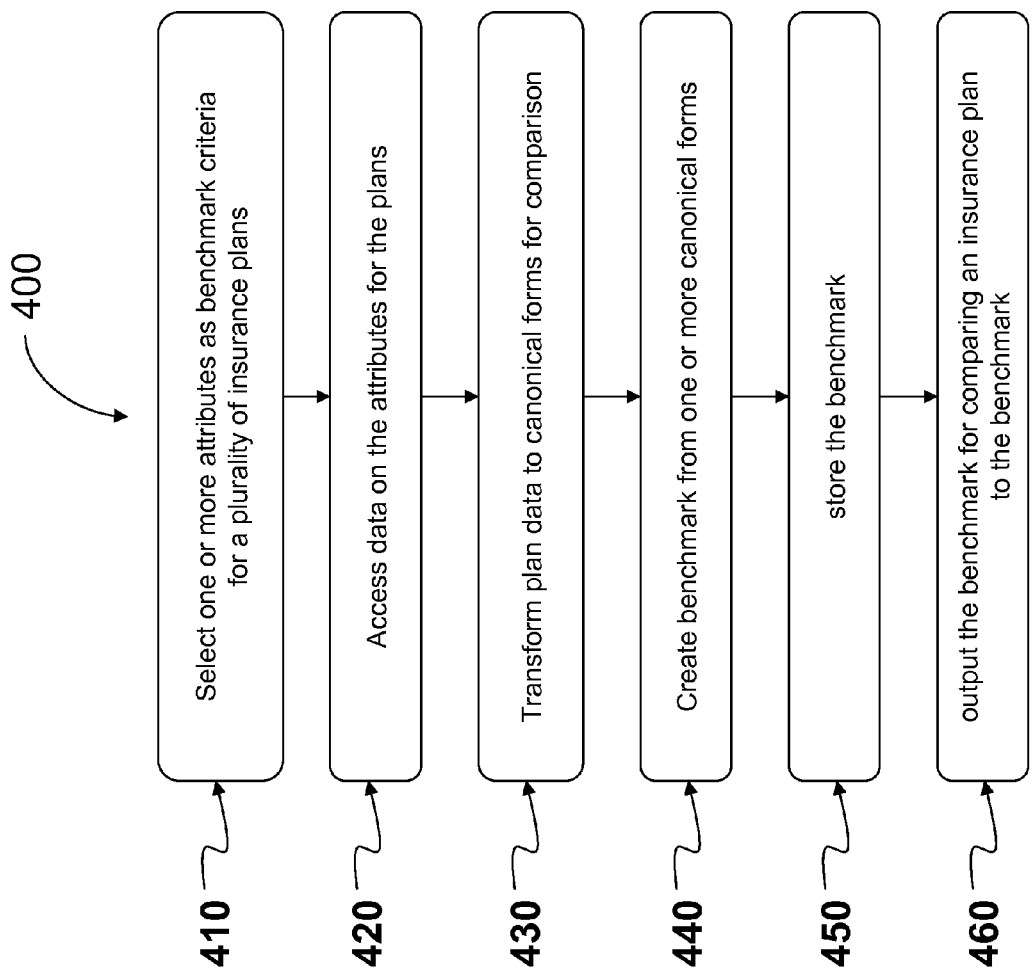
FIG. 4 is a flow diagram of a method for calculating, storing and outputting a benchmark for comparing an insurance plan within a peer group.

Referring now to FIG. 4 is a flow diagram of a method for calculating, storing and outputting a benchmark for comparing an insurance plan within a peer group is shown and described. In brief overview, one or more attributes are selected as benchmark criteria for a plurality of insurance plans (step 410). Data on the attributes is accessed for the plurality of plans (step 420). Data corresponding to each plan in the plurality of plans is transformed to a canonical form for fair comparison across different plans (step 430). A benchmark is created from one or more canonical forms (step 440) and the benchmark is stored (step 450). The benchmark is outputted for comparing an insurance plan to the benchmark (step 460).

Now, in greater details, the user selects one or more attributes as benchmark criteria for the plurality of insurance plans (step 410). In one embodiment, the benchmark criteria can be one of an employer attribute, an employer location attribute, a plan attribute, a bid attribute, a price specification item attribute, a benefit specification attribute and a vendor attribute. In another embodiment, the benchmark criteria can be any other attribute of an insurance plan as apparent to one ordinarily skilled in the art. In still another embodiment, the benchmark criteria can be substantially similar to the comparison criteria.

In one embodiment, the user chooses the benchmark criteria using the benchmark wizard of a user interface 215. In another embodiment the benchmark criteria can be related to the organization of the user. In such an embodiment, the benchmark criteria may include a type of industry, a number of employees and geographic location of the organization. In still another embodiment, the benchmark criteria may be related to an insurance plan. In such an embodiment, the benchmark criteria can include location of coverage, type of coverage, plan price or bid, contract duration, expected enrollment, plan source, add on(s) and type of employee. In yet another embodiment, the user may be given an option to create composite benchmark criteria from one or more of the selected benchmark criteria.

Data on the attributes selected as benchmark criteria are accessed in any manner to create the benchmark (step 420). In one embodiment, the data is accessed from the database 101. In another embodiment, the data may be accessed from a part of the server 105 or any other storage location acting as a repository of information on insurance plans. In still another embodiment, the data may be collected real-time from one or more possible repositories based on the attributes chosen as the benchmark criteria.

The accessed data for the different insurance plans are then transformed to canonical forms for comparison (step 430). In one embodiment, the transformation includes assigning a score to each attribute of the insurance plans. In another embodiment, the score is assigned to each attribute by the user. In still another embodiment, the score for each attribute is decided by an algorithm. In yet another embodiment, all the attributes are assigned equal scores. In another embodiment, an administrator may specify scores to be assigned to each of the attributes. In still another embodiment, the administrator uses qualitative judgment to assign the scores.

In one embodiment, the transformation (step 430) includes normalization of the accessed data. In another embodiment, the normalization process includes extraction of data on a spreadsheet. In still another embodiment, the extracted data is organized into a plurality of spreadsheets. In one embodiment, the extracted data is organized in a spreadsheet on the basis of one or more attributes of an organization including, but not limited to, an organization code, number of employees and location. In another embodiment, the extracted data is organized in a spreadsheet on the basis of one or more attributes of an insurance plan including, but not limited to, product type, effective dates, contract duration, funding type and expected enrollment. In still another embodiment, the extracted data is organized in a spreadsheet on the basis of one or more attributes of plan benefits including, but not limited to, co-pay amount, deductible limitation, maximum, exceptions and co-insurance amount. In yet another embodiment, the extracted data is organized on the basis of attributes of pricing information of a plan.

In one embodiment, normalization of data entails encoding of a plurality of key issues. In another embodiment, limitations and/or restrictions associated with a plan is encoded. In still another embodiment, values of maximum amounts associated with benefits are encoded. Typical examples of such maximums include maximum out-of-pocket expense, maximum co-pay amount, maximum annual limit, lifetime maximum associated with a benefit and lifetime plan maximum. In yet another embodiment, exceptions associated with benefits are encoded. Typical examples of such exceptions include benefit specific inclusions and exclusions and combination of benefits to reach a maximum. In one embodiment, combined benefits and/or multiple benefits are also encoded as a single benefit.

A benchmark is created from the one or more canonical forms (step 440). In one embodiment, the benchmark is a mathematical composite of a set of plans that meet the benchmark criteria. In one embodiment, the benchmark is created through one or more mathematical and/or logical operations on the transformed data. In another embodiment, the benchmark is created as a representative data set of the plurality of insurance plans. In still another embodiment, creating of the benchmark involves choosing between a plurality of substantially similar attributes to maintain uniformity across all the plans considered to create the benchmark. As an example if an insurance plan has both an annual limit and a lifetime limit as a 'maximum' attribute, then the annual limit may be chosen over the lifetime limit to create the benchmark. Similarly, if coverage for both retail and mail order drugs available for a particular plan, then the 'retail' may be chosen as 'prescription drug coverage' attribute of the benchmark. In other embodiments, a plurality of such choices may be made in creating the benchmark as apparent to one ordinarily skilled in the art. In one embodiment, a plurality of benchmarks may be created.

The benchmark is stored for later retrieval (step 450). In one embodiment, the benchmark is stored in the database 101. In another embodiment, the benchmark is stored in the server 105 or any other storage location as apparent to one skilled in the art. In one embodiment, the benchmark is outputted from the storage location for comparing an insurance plan to the benchmark (step 460). In another embodiment, the benchmark is outputted to generate a report on the benchmark data.

Figure 5A:
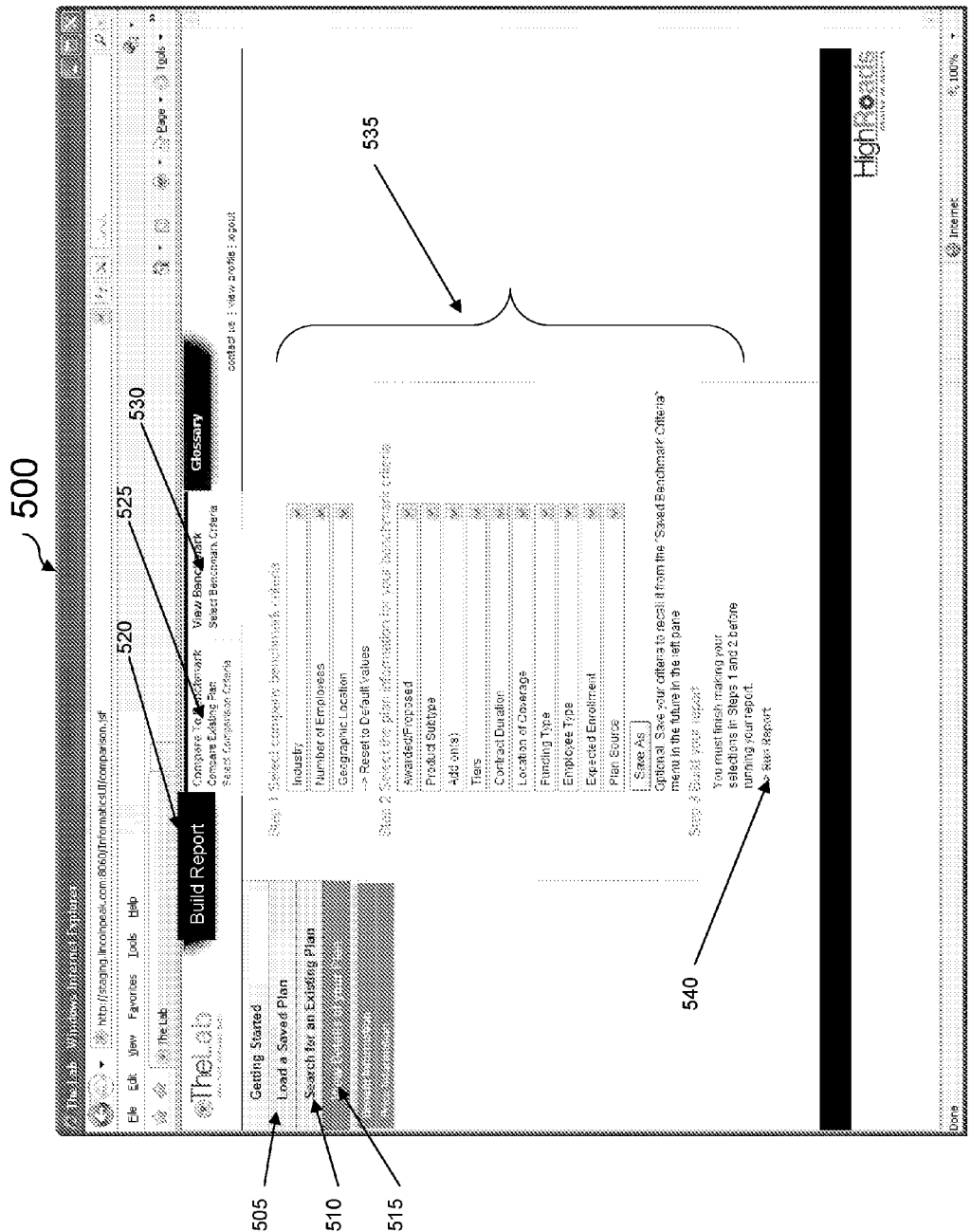

Referring now to FIG. 5A, an embodiment of an user interface screen 500 is shown. In one embodiment, the user interface screen 500 is a webpage. In another embodiment, the user interface screen 500 is part of a web portal. In still another embodiment, the user interface screen 500 is displayed by an application program executing on the client 110 or the server 105. In one embodiment, the user interface screen 500 includes a hyperlink 505 to load a pre-saved plan. In another embodiment, the user interface screen 500 includes a hyperlink 510 to search for an existing plan and another hyperlink 515 to view the details of a plan. In one embodiment, the user interface screen 500 includes a panel that guides the user through major benchmark process transitions. In another embodiment, the panel provides a map of the location of the user in the process, steps completed and steps remaining. In still another embodiment, the panel allows the user to move sequentially or directly to a step in the process. In still another embodiment, the user interface screen 500 includes hyperlinks to perform one or more of the following functionalities: build (520) a report, compare (525) the existing plan to the benchmark and view report (530) on the benchmark data. In one embodiment, the user can select comparison criteria for comparing (525) the existing plan to the benchmark. In another embodiment, the user is allowed to select the benchmark criteria to view (530) the report on the benchmark.

In one embodiment, the user interface screen 500 includes a form 535 for collecting information on an insurance plan. In another embodiment, the form 535 includes fields for collecting data on the benchmark criteria. In still another embodiment, the form 535 includes fields for collecting information on plan information related to the benchmark criteria. In yet another embodiment, the form 535 includes a hyperlink 540 to run a report based on the information entered by the user. In one embodiment, the user interface screen 500 allows the user to save the information entered by the user.

In one embodiment, the user interface screen 500 includes drop down menus. In another embodiment, the user interface screen 500 includes fillable fields to be completed by the user. In yet another embodiment, the interface screen 500 includes one or more of: interactive content, multimedia content, hyperlinks, dynamically generated objects, forms and other content as apparent to one ordinarily skilled in the art.

Figure 5B:
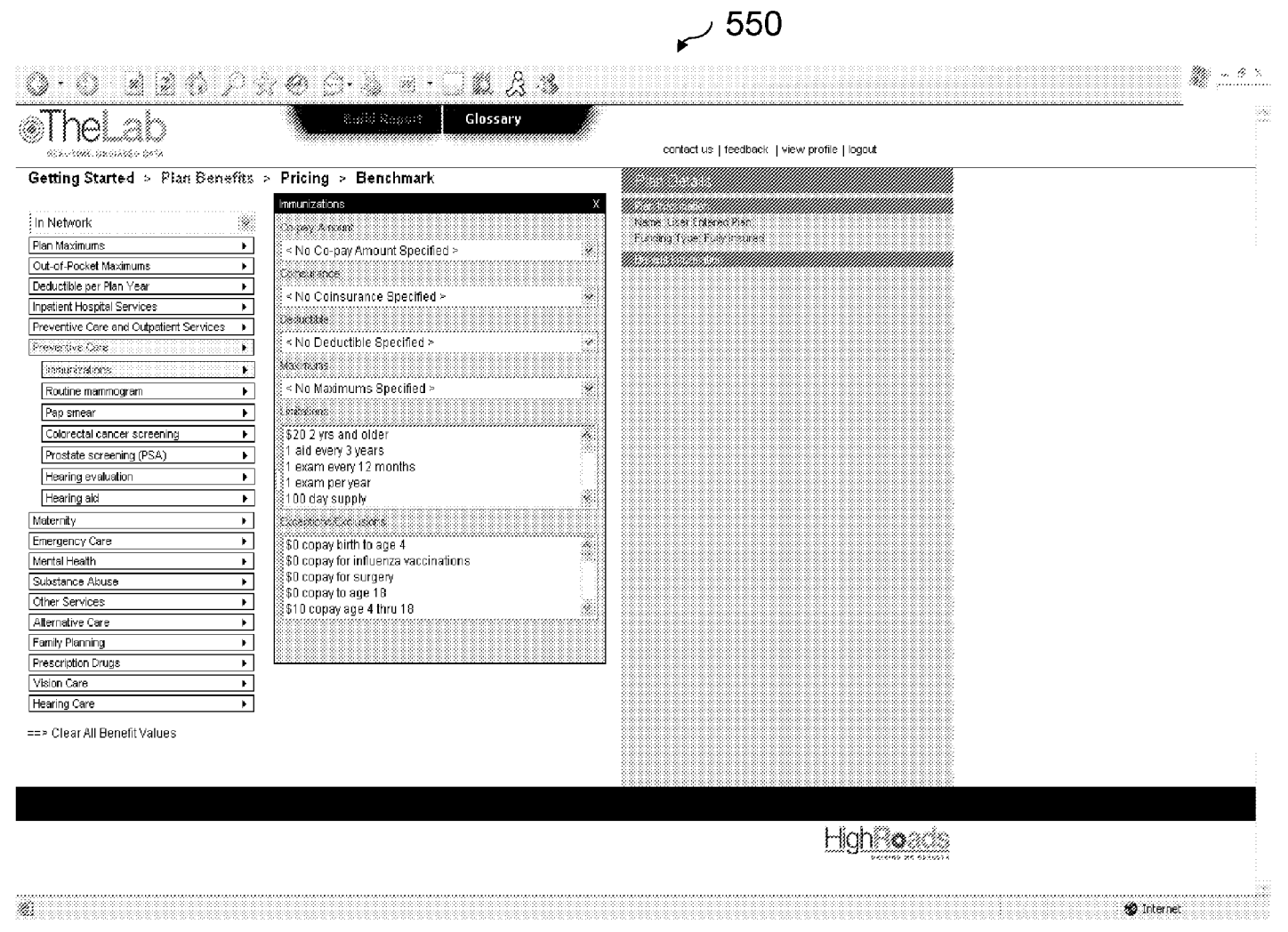

Referring now to FIG. 5B, example of another user interface 550 is shown. In one embodiment, the user interface 550 is displayed when the user clicks a link in the user interface screen 500. In another embodiment, the user interface 550 allows the user to enter details on attributes of an insurance plan. In still another embodiment, the interface 550 allows the user to enter details on the benchmark. In one embodiment, the user interface 550 includes one or more of the following: menu driven content, interactive content, multimedia content, hyperlinks, dynamically generated objects, forms and other content as apparent to one ordinarily skilled in the art.

Figure 6A:
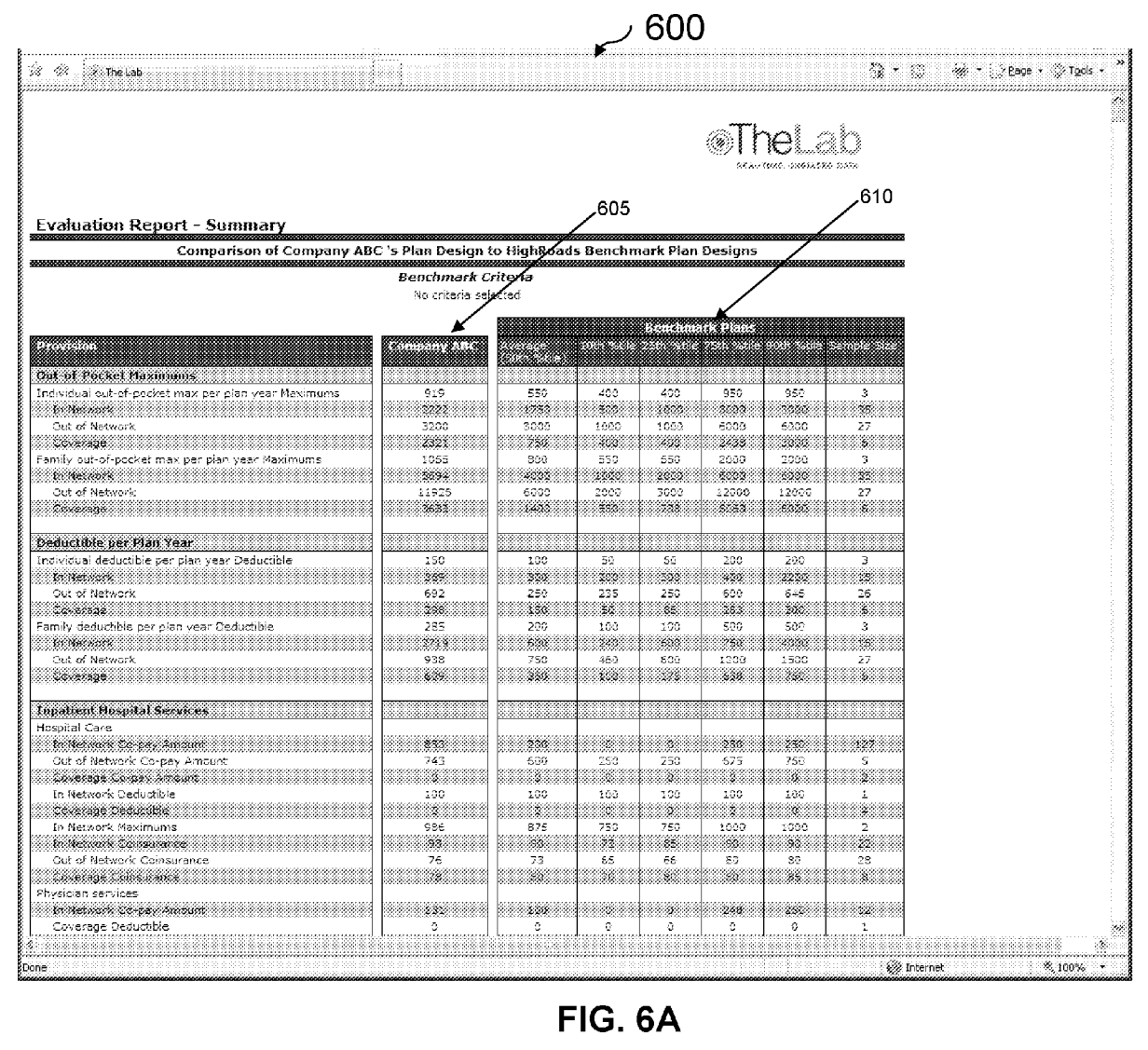
Figure 6B:
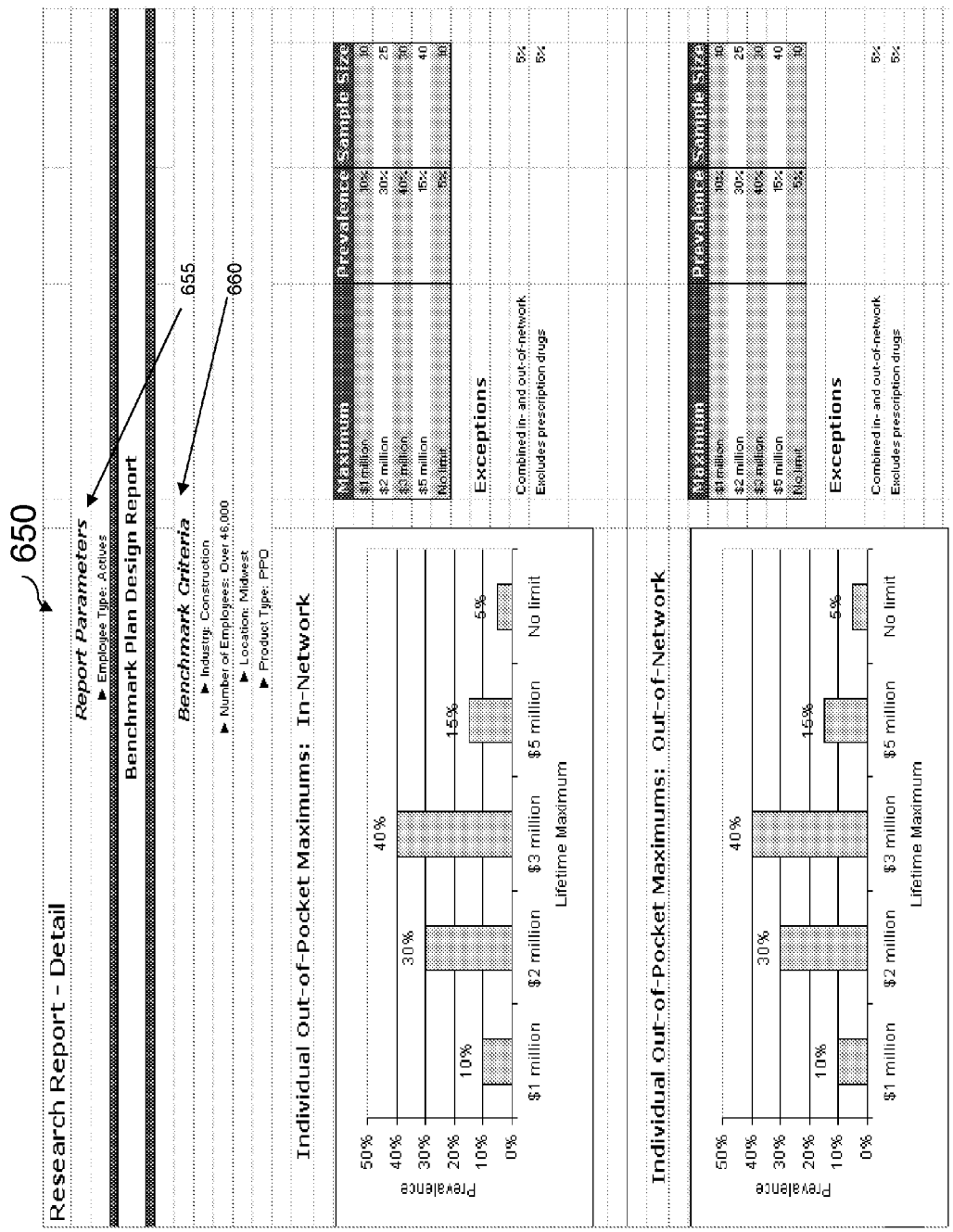
Figure 6C:
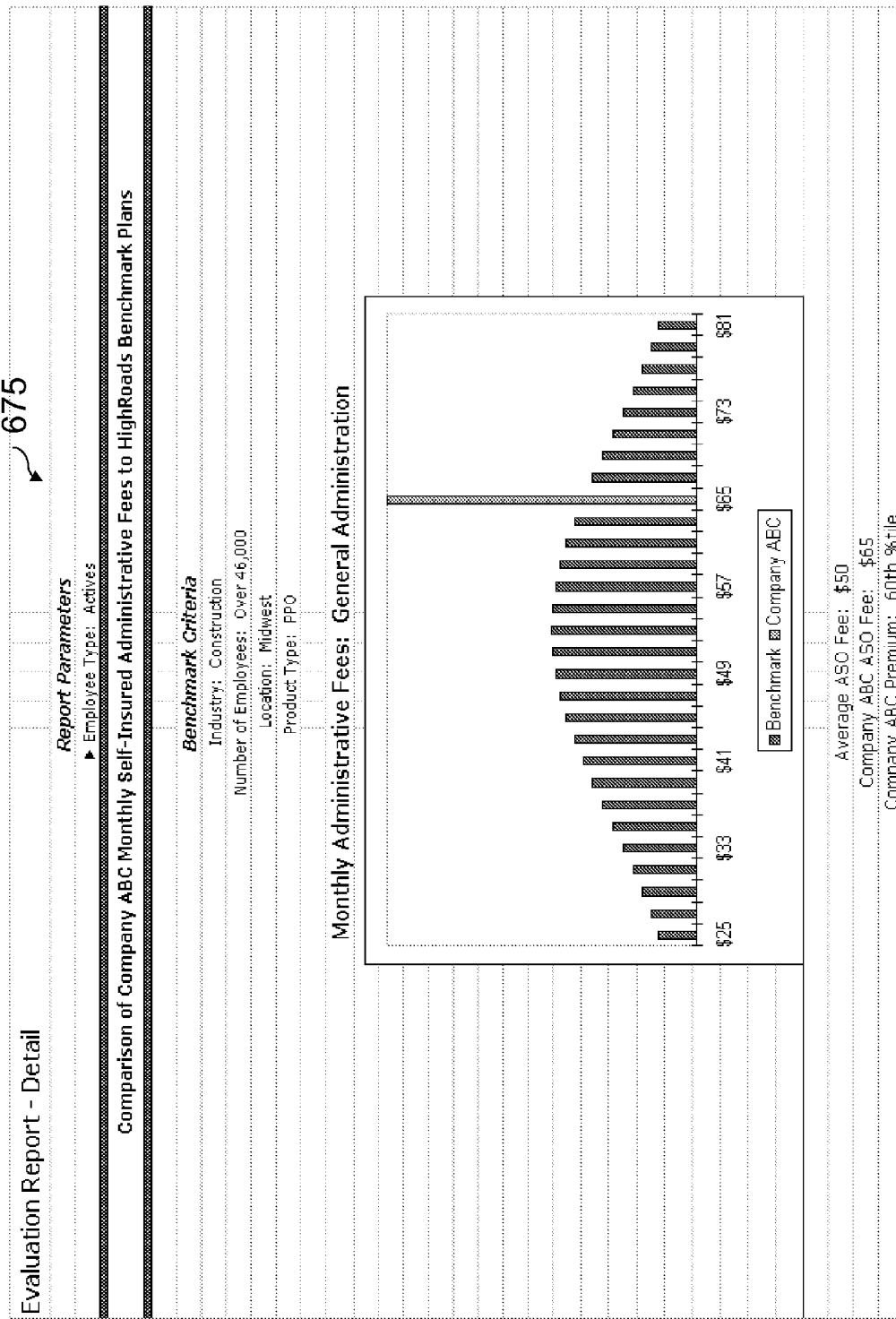

Referring now to FIGS. 6A, 6B and 6C example screenshots of reports are shown and described. In one embodiment, the report 600 includes comparative results of an insurance plan 605 of the user's organization (referred to as Company ABC) to the benchmark 610. In another embodiment the report 600 compares the insurance plan 605 to the benchmark 610 on a plurality of attributes. In one embodiment, the plurality of attributes may be selected by the user as comparison criteria. In another embodiment, the attributes can be chosen from a plurality of possible attributes as described with respect to FIG. 3. In still another embodiment, the results may be presented in a tabular form. In yet another embodiment, the benchmark may be further subdivided on a percentile basis. This allows the user to see what percentile of the benchmark 610 are above or below the insurance plan 605 for each of the plurality of attributes.

In one embodiment, the organizations 120 in the peer group 115 from which data is collected to create the benchmark 610, is not disclosed in the report. This allows a discreet comparison of the insurance plan 605 with the peer group 115 of Company ABC without individual identification of the organizations 120 in the peer group 115. In still another embodiment, the report 600 presents the sample size or the number of organizations on which the benchmark for a particular attribute is based.

In one embodiment, the report 650 as shown in FIG. 6B presents a report on the benchmark. In one embodiment, the report 650 includes graphical representation of data such as charts, graphs, tables, and other representations as apparent to one ordinarily skilled in the art. As an example, FIG. 6B depicts a graphical representation of a distribution out-of-pocket maximum amounts for insurance plans across a plurality of organizations in a peer group. The 'in-network' graph indicates that for 10% of organizations in the peer group, the individual out-of-pocket maximum is $1 million. Similarly, for 30%, 40%, and 15% organizations in the peer group, the individual out-of-pocket maximums are $2 million, $3 million and $5 million, respectively. For 5% organizations in the peer group, there is no limit for the out-of-pocket maximum. In one embodiment, the actual number of the organizations are also specified in the report without identifying the actual organizations.

Referring to FIG. 6C, another example 675 of the report is shown. In one embodiment, the report 675 presents the standing of the Company ABC within its peer group with respect to an attribute of an insurance plan. In the example shown in FIG. 6C, a comparison of monthly administrative fees of an insurance plan of Company ABC with the benchmark is shown. The report 675 indicates that the $65 administrative fees for Company ABC is at the $60^{th}$ percentile within the peer group of Company ABC.

As an example overall operational overview, in one embodiment, the user enters a base plan and selects a plurality of benchmark criteria, a plurality of comparison criteria and a type of report to view. In one embodiment, the benchmark is created using the plurality of benchmark criteria and the base is compared to the benchmark using the comparison criteria. In one embodiment, the user can compare a plurality of attributes of an employee insurance plan to employee insurance plans of substantially similar organizations in a peer group. In another embodiment, the user can design an insurance plan for an organization using sets of defined attributes and the benchmark. In another embodiment, the user can view details of the plans from the peer group without identifying the individual organizations. This allows confidentiality of insurance plan data collected from a plurality of organizations. In one embodiment, an administrative unit populates the database with insurance plan data for one or more attributes from a plurality of organizations. In another embodiment, the database is updated intermittently.

As an example operation, a user logs in to a homepage of the system through a log-in form on a public web page. From the homepage the user may choose to be redirected to the benchmark wizard page. The benchmark wizard page allows the user to research different benchmarks by selecting benchmark criteria. The user may also perform an evaluation of an insurance plan by selecting comparison criteria, loading or entering a plan and selecting a type of report to view. The benchmark wizard guides the user through the transitions in the process by providing a map of the position of the user in the process. At every step, specific steps are shown in the map so that the user knows whet to do next. A report is generated in accordance with the comparison criteria selected by the user. The report presents a comparison of the user entered plan to a pre-computed benchmark in the forms of graphs, tables and other visual aids.

In view of the structure and functions of the systems and methods described here, the present solution provides a discreet and unbiased real-time system for comparing an employee insurance plan of an organization with that of other organizations in a peer group. Having described certain embodiments of methods and systems for the insurance plan comparison, it will now become apparent to one of skill in the art that other embodiments incorporating the concepts of the invention may be used. Therefore, the invention should not be limited to certain embodiments, but rather should be limited only by the spirit and scope of the following claims:

What is claimed is:

1. A method of comparison of insurance plans of employees among a peer group of an organization, the method:
deriving a benchmark associated with a plurality of the insurance plans by transforming data associated with each insurance plan into a canonical form that enables comparisons across the plurality of insurance plans, the transforming step normalizing into a common attribute a first attribute from a first insurance plan and a second attribute from a second insurance plan, the second attribute being the same as the first attribute but differing in form, the benchmark being derived from the canonical form;
receiving, by a web interface, data on a plurality of attributes of an insurance plan of an employee associated with the organization, the web interface executing on a server;
receiving, by the web interface, one or more attributes as comparison criteria;
comparing, by a computing device in communication with the web interface, the comparison criteria to the benchmark associated with a plurality of insurance plans of employees of a peer group of the organization;
generating at least one report based on the comparison; and
providing, by the web interface to the user, the at least one report.

2. The method of claim 1, wherein the peer group is a group of organizations substantially similar to the organization of the user in one or more of the following: number of employees, line of business, location, turnover, profit margin, and product.

3. The method of claim 1 wherein the comparison criteria includes one or more of an employer attribute, a location attribute, a plan attribute, a bid attribute, a price specification item attribute, a benefit attribute and a vendor attribute.

4. The method of claim 1 wherein information identifying an organization in the peer group is not disclosed in the at least one report.

5. The method of claim 1 further comprising controlling an access and permissions of the user.

6. A method of using a benchmark for comparison of insurance plans among a peer group of an organization, the method comprising the unordered steps of:
(a) receiving, by a web interface, a plurality of attributes, the web interface executing on a server;

(b) selecting one or more attributes as benchmark criteria for a plurality of insurance plans of the peer group of the organization;

(c) accessing, by a computing device, data on the attributes for the plurality of insurance plans;

(d) transforming, by the computing device, the data for each of the plurality of insurance plans to one or more canonical forms using one or more mathematical operations on the data, the canonical forms enabling mathematical comparisons across the plurality of insurance plans, the transforming step normalizing into a common attribute a first attribute from a first insurance plan and a second attribute from a second insurance plan, the second attribute being the same as the first attribute but differing in form;

(e) creating a benchmark comprising a set of data through operations on one or more canonical forms;

(f) storing the benchmark; and (g) outputting, by the computing device, the benchmark for comparing an insurance plan of the organization to the benchmark.

7. The method of claim 6, wherein the peer group is a group of organizations substantially similar to the organization of the user in one or more of the following: number of employees, line of business, location, turnover, profit margin, and product.

8. The method of claim 6, further comprising creating a composite benchmark criteria based on one or more attributes of the benchmark.

9. The method of claim 6, further comprising defining a relationship associated with the one or more attributes.

10. The method of claim 6, further comprising associating a quantitative score with each of the one or more attributes.

11. The method of claim 6, wherein the benchmark criteria includes one or more of an employer attribute, a location attribute, a plan attribute, a bid attribute, a price specification item attribute, a benefit attribute and a vendor attribute.

12. The method of claim 6, further comprising classifying the data on the plurality of insurance plans into one or more classes, the classes being defined based on one or more attributes by an administrator.

13. The method of claim 12, further comprising defining a relationship associated with the one or more classes.

14. The method of claim 12, further comprising associating a quantitative score with each of the one or more classes.

15. A system of presenting a comparison of insurance plans, the system comprising:

a database which stores information on a plurality of attributes of a plurality of employee insurance plans;

a server, in communication with the database, which:

processes information stored in the database based on information on an insurance plan associated with an organization received from a client, and one or more rules, identifies at least one peer group within organizations associated with the plurality of insurance plans;

derives a benchmark associated with a plurality of the insurance plans associated with the identified peer group by transforming data associated with each insurance plan into a canonical form that enables comparisons across the plurality of insurance plans, the transforming step normalizing into a common attribute a first attribute from a first insurance plan and a second attribute from a second insurance plan, the second attribute being the same as the first attribute but differing in form, the benchmark being derived from the canonical form;

generates at least one report, the report generated by comparing the received information to the benchmark.

16. The system of claim 15, wherein the server identifies a peer group based on substantial similarity to the organization in one or more of the following: number of employees, line of business, location, turnover, profit margin, and product.

17. The system of claim 15, further comprising an Extraction, Transformation and Loading (ETL) unit managing data transport between the server and the database.

18. The system of claim 15, further comprising an adaptor, in communication with the ETL unit, generating a value of an attribute stored in the database.

19. The system of claim 15, further comprising one or more subsystems for performing the following: authentication and access control, attribute management and report management.

20. The system of claim 15, wherein the client further comprises a user interface.

21. The system of claim 15, wherein the client further comprises an administrator interface.

* * * * *